(12) United States Patent
He et al.

(10) Patent No.: US 12,540,375 B2
(45) Date of Patent: Feb. 3, 2026

(54) ADVANCED BOND COAT MATERIALS FOR TBC WITH IMPROVED THERMAL CYCLIC FATIGUE AND SULFIDATION RESISTANCE

(71) Applicant: OERLIKON METCO (US) INC., Westbury, NY (US)

(72) Inventors: Jianhong He, Bethpage, NY (US); Timothy Sharobem, Brooklyn, NY (US); Brian Keyes, Smithtown, NY (US); Dianying Chen, Westbury, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 121 days.

(21) Appl. No.: 17/433,413

(22) PCT Filed: Mar. 7, 2019

(86) PCT No.: PCT/US2019/021091
§ 371 (c)(1),
(2) Date: Aug. 24, 2021

(87) PCT Pub. No.: WO2020/180325
PCT Pub. Date: Sep. 10, 2020

(65) Prior Publication Data
US 2022/0145426 A1    May 12, 2022

(51) Int. Cl.
*C22C 19/05* (2006.01)
*C04B 35/48* (2006.01)
(Continued)

(52) U.S. Cl.
CPC ............ *C22C 19/055* (2013.01); *C04B 35/48* (2013.01); *C04B 35/62222* (2013.01);
(Continued)

(58) Field of Classification Search
None
See application file for complete search history.

(56) References Cited

U.S. PATENT DOCUMENTS 4,117,179 A    9/1978    Jackson et al.
4,124,737 A    11/1978    Wolfla et al.
(Continued)

FOREIGN PATENT DOCUMENTS

CN    1340576    3/2002
CN    101109291    1/2008
(Continued)

OTHER PUBLICATIONS

Int'l Search Report (Form PCT/ISA/210) conducted in Int'l Application No. PCT/US2019/21091 (Jan. 21, 2020).
(Continued)

*Primary Examiner* — Elizabeth Collister
(74) *Attorney, Agent, or Firm* — GREENBLUM & BERNSTEIN, P.L.C.

(57) ABSTRACT

A bond coating material providing unexpectedly high thermal cyclic fatigue resistance and sulfidation resistance, and unexpectedly prolonged thermal cycle life in high temperature environments of gas turbine engine components with and without the presence of sulfur contains: a) 10% to 30% by weight chromium, b) at least one of tantalum and molybdenum in a total amount of 3% to 15% by weight, c) 5% to 13% by weight aluminum, d) 0.1% to 1.4% by weight silicon, e) 0.1% to 0.8% by weight yttrium, f) 0% to 1.2% by weight carbon, g) 0% to 1% by weight dysprosium, h) 0% to 1% by weight cerium, i) the balance being nickel, and the percentages of a) to i) adding up to 100% by weight. The total amount of tantalum and molybdenum, and the amounts of aluminum and silicon are each critical for avoiding delamination of a top coat from a bond coat.

26 Claims, 1 Drawing Sheet

(51) Int. Cl.
  *C04B 35/622* (2006.01)
  *C23C 4/073* (2016.01)
  *C23C 4/11* (2016.01)
  *C23C 4/129* (2016.01)
  *C23C 4/134* (2016.01)

(52) U.S. Cl.
  CPC .............. *C23C 4/073* (2016.01); *C23C 4/11* (2016.01); *C04B 2235/3217* (2013.01); *C04B 2235/3246* (2013.01); *C04B 2235/9669* (2013.01); *C23C 4/129* (2016.01); *C23C 4/134* (2016.01)

(56) References Cited

U.S. PATENT DOCUMENTS

| | | |
|---|---|---|
| 4,275,124 A | 6/1981 | McComas et al. |
| 4,743,514 A | 5/1988 | Strangman et al. |
| 5,073,433 A | 12/1991 | Taylor et al. |
| 5,077,140 A | 12/1991 | Luthra et al. |
| 5,141,821 A | 8/1992 | Lugscheider et al. |
| 5,780,116 A * | 7/1998 | Sileo ............... F01D 11/122 427/455 |
| 6,475,642 B1 | 11/2002 | Zhao et al. |
| 8,197,950 B2 | 6/2012 | Taylor et al. |
| 2004/0159552 A1 | 8/2004 | Khan et al. |
| 2005/0042474 A1 | 2/2005 | Eckardt et al. |
| 2005/0106332 A1* | 5/2005 | Beers ............... C23C 4/073 427/580 |
| 2005/0112398 A1 | 5/2005 | Darolia et al. |
| 2007/0202003 A1* | 8/2007 | Arrell ............... C22C 19/057 420/443 |
| 2008/0163785 A1 | 7/2008 | Hardwicke et al. |
| 2008/0163786 A1* | 7/2008 | Feng ............... C23C 28/345 106/1.21 |
| 2010/0119871 A1 | 5/2010 | Feng et al. |
| 2015/0197833 A1* | 7/2015 | Kawagishi ........ C22F 1/10 420/445 |
| 2016/0237581 A1* | 8/2016 | Foster ............... C25D 7/00 |
| 2018/0099909 A1 | 4/2018 | Doesburg et al. |

FOREIGN PATENT DOCUMENTS

| | | | |
|---|---|---|---|
| CN | 101220426 | 7/2008 | |
| CN | 101733610 | 6/2010 | |
| CN | 103160711 | 6/2013 | |
| CN | 106435277 | 2/2017 | |
| EP | 1428982 | 6/2004 | |
| EP | 1 908 857 | 4/2008 | |
| GB | 2095700 A * | 10/1982 | ............ C22C 19/00 |
| JP | 2003-328061 | 11/2003 | |
| RU | 2523185 | 4/2014 | |
| WO | 03/027361 | 4/2003 | |
| WO | 03/060194 | 7/2003 | |
| WO | 2005/038074 | 4/2005 | |
| WO | 2010/124923 | 11/2010 | |
| WO | 2018/152328 | 8/2018 | |

OTHER PUBLICATIONS

Int'l Written Opinion (Form PCT/ISA/237) conducted in Int'l Application No. PCT/US2019/21091 (Jan. 21, 2020).
Extended Europe Search Report/Office Action conducted in counterpart Europe Appln. No. 19918263.5-1103 (Sep. 9, 2022).
Russia Decision to Grant Patent in counterpart Russia Appln. No. 2021127871 (Oct. 3, 2022) (w/ Translation).
China Search Report/Office Action conducted in counterpart China Appln. No. 201980092919.9 (Apr. 6, 2022) (w/ translation).

* cited by examiner

ADVANCED BOND COAT MATERIALS FOR TBC WITH IMPROVED THERMAL CYCLIC FATIGUE AND SULFIDATION RESISTANCE

FIELD OF THE INVENTION

The present invention relates to advanced bond coat materials for thermal barrier coatings (TBCs) with improved thermal cyclic fatigue resistance and sulfidation resistance. The advanced bond coat materials may be in the form of a powder, alloy, bond coat or coating, and may be employed in a thermal spray powder with a top coat material to obtain a thermal barrier coating (TBC) system. The present invention also relates to a method for reducing delamination of a top coat from a substrate, such as a gas turbine engine component.

BACKGROUND OF THE INVENTION

A complete thermal barrier coating system includes a top coat, such as a thermal barrier coating (TBC), and a bond coat or bond layer. A common bond coat is made of MCrAlY alloy, where M represents Ni, Co, Fe or their combinations. To increase the performance of a bond coat, Hf, Re and Pt and various other rare earth elements are often added in advanced bond coats. A common top coat is made of zirconia ($ZrO_2$) stabilized by one or more of yttrium oxide, ytterbium oxide, cerium oxide, titanium oxide, magnesium oxide, calcium oxide, lanthanum oxide, or dysprosium oxide, or of gadolinium zirconate ($Gd_2Zr_2O_7$).

The TBC system is applied and bonded to a substrate, such as a superalloy and protects the substrate in a hot and harsh environment such as in a gas turbine engine environment. The bond coat or bond layer is between the top coat and the substrate, and bonds the top coat to the substrate. The bond coat or bond layer is formed from a bond coating material, which may be in powder form for application to the substrate. The bond coat or bond layer formed from the bond coating material affects the thermal cyclic fatigue and sulfidation resistance of the top coat, such as a TBC, which may be evaluated for effectiveness by the furnace cyclic lifetime of the TBC with and without the presence of sulfur. A TBC can be degraded due to high temperatures and a harsh environment, such as the presence of sulfur. For example, using oil containing a high sulfur content as fuel in an industrial gas turbine having a TBC is one important factor reducing TBC lifetime.

One important failure of a complete TBC system happens at the bond coat/top interface. When a TBC system is exposed to a high temperature, an oxide layer, called a thermally grown oxide (TGO), nucleates and grows between the bond coat and top coat, to block oxygen to further diffuse inward to prevent the substrate from oxidation. A dense alpha-alumina layer of TGO is desired because it effectively blocks oxygen diffusion inward and also grows slowly itself. However, there are significant differences in thermal expansion coefficients of the top coat, bond coat and TGO. Significant internal stresses caused by temperature changes are built up at the top coat/TGO interface and the TGO/bond coat interface while a TBC system experiences thermal cycles (room temperature to operation temperature to room temperature). As the TGO layer thickens, the thermal internal stresses become higher and higher, and eventually the top coat, such as the TBC, fails due to delamination by thermal internal stresses. To increase performance and energy efficiency, modern jet engines and industrial gas turbines are seeking a higher operation temperature, therefore a higher thermal shock resistance of a TBC system is desired.

As disclosed in U.S. Pat. No. 4,124,737 to Wolfla et al, a wide variety of coatings are available for the protection of metal alloy substrates from wear or corrosion in many environments. These coatings range from pure metallic coatings to pure ceramic coatings and encompass the cermet type of coatings which have a high volume fraction of a ceramic phase in a metal matrix. As disclosed in Wolfa, one of the most difficult environments in which to provide protection for a metal substrate is one which combines a high temperature oxidizing or sulfidizing attack with wear of a fretting or impact nature. Only a few coatings, according to Wolfa et al, have been successful in this type of environment and virtually none when the temperature exceeds about 1800° F. In the relatively low temperature range, i.e., up to 1000° or 1200° F., cermet coatings of tungsten carbide with a cobalt binder are commonly and very successfully used. Above this temperature, however, this type of coating is too rapidly oxidized to be useful for any extended period of time. Cermets as a general class also suffer from a lack of fatigue and impact resistance. Wolfa et al discloses a coating composition, corrosion and wear-resistant coated article and processes for producing such article where the coated article consists of a substrate with a coated layer, said layer being composed of a cobalt-base alloy containing 17 to 35 percent chromium, 5 to 20 percent tantalum, 0 to 2 percent yttrium, 0 to 2.5 percent silicon, 0 to 3.0 percent manganese, 0.5 to 3.5 percent carbon, 0 to 5 or 14 percent aluminum, all in weight percent, and 0 to 50 volume percent of at least one metal oxide. The Wolfa composition is not a bond coat, but an overlay coat (without a top coat) for increasing wear- and corrosion-resistance at high temperature.

U.S. Pat. No. 4,117,179 to Jackson et al discloses an article of manufacture having improved high temperature oxidation and corrosion resistance comprising: (a) a superalloy substrate containing a carbide reinforcing phase, and (b) a coating consisting of chromium, aluminum, carbon, at least one element selected from iron, cobalt or nickel, and optionally an element selected from yttrium or the rare earth elements. Another embodiment comprises an aluminized overcoating of the coated superalloy. According to Jackson, the carbon content of the coating must be sufficient to completely saturate all of the MCrAlY phases with carbon, however, insufficient to form excessive amounts of carbides within the coating composition which deleteriously affect the oxidation and corrosion resistance of the coating under superalloy service conditions.

U.S. Pat. No. 5,141,821 to Lugscheider discloses a corrosion- and wear-resistant high temperature composite material based on an alloy of the type MCrAlY as the matrix metal with platinum and/or rhodium as alloying elements in amounts of 5 to 15 wt. %, and included particles of mechanically resistant substances in the form of carbides of the elements vanadium, niobium, tantalum, titanium, zirconium, hafnium, chromium, molybdenum and/or tungsten and/or mixtures thereof being included in the matrix metal in amounts of 0.01 to 75 wt. %, preferably 5 to 75 wt. %, based on the high temperature composite material.

U.S. Pat. No. 4,275,124 to McComas et al discloses a wear, oxidation, and corrosion resisting coating alloy and a coated superalloy article, useful at temperatures up to 1000° C. or higher which is comprised of chromium, aluminum, yttrium, and carbon with the balance being selected from the group consisting of nickel, cobalt, iron, or mixtures thereof. According to McComas et al the invention results in a coating consisting essentially of a carbon rich MCrAlY matrix containing fine metal carbides of the order of 1-2 microns size and chromium carbides of the order of 12 microns. An embodiment entails a coating composition consisting essentially of, by weight, 18-80% chromium, 1.2-29% aluminum, up to 4.8% yttrium, 0.6-11% carbon, balance selected from the group consisting of nickel, cobalt and iron or mixtures thereof. According to McComas et al, Wolfa et al., U.S. Pat. No. 4,124,737 discloses a tantalum carbide containing Co—Cr alloy coating for resisting wear at high temperature, which consists essentially by weight percent of 17-35 Cr, 5-20 Ta, 0.5-3.5 C, balance Co. and other embodiments contain rare earth metals, Al, Si, and various metal oxides. As to the use of tantalum, Ta, McComas et al agrees with Wolfa et al., that Ta is a solid solution strengthener in high temperature alloys. However, according to McComas et al, while preferred for oxidation-corrosion resistance over W and Mo, as a refractory metal Ta at best does not improve the oxidation-corrosion resistance of a CoCrAlY alloy, and most likely degrades it, if only by replacing other elements in the system.

The present invention provides an advanced bond coat for top coats such as thermal barrier coatings (TBCs) application in high temperature gas turbine engine components. The TBCs using the bond coat to bond to a substrate such as a superalloy exhibit unexpectedly high thermal cyclic fatigue resistance and sulfidation resistance, and unexpectedly prolonged thermal cycle life in the high temperature environments of gas turbine engine components with and without the presence of sulfur. The complete TBC system forms a desirable, dense alpha-alumina layer of TGO at the interface of the bond coat and top coat, such as the TBC, which is sufficient to block oxygen to further diffuse inward to prevent the substrate from oxidation. The TGO which is formed is not excessively thick so as to cause failure due to delamination by thermal internal stresses for an unexpectedly prolonged period of time.

SUMMARY OF THE INVENTION

In accordance with the present invention, a bond coating material which provides unexpectedly high thermal cyclic fatigue resistance and sulfidation resistance, and unexpectedly prolonged thermal cycle life in high temperature environments of gas turbine engine components with and without the presence of sulfur comprises:
  a) chromium in an amount of from 10% by weight to 30% by weight, preferably from 20% by weight to 26% by weight,
  b) at least one of tantalum and molybdenum, where the total amount of tantalum and molybdenum is from 3% by weight to 15% by weight, preferably from 5% by weight to 12% by weight, more preferably from 9% by weight to 11% by weight,
  c) aluminum in an amount of from 5% by weight to 13% by weight, preferably from 6% by weight to 10% by weight,
  d) silicon in an amount of from 0.1% by weight to 1.4% by weight, preferably from 0.3% by weight to 1.1% by weight, more preferably from 0.5% by weight to 1.0% by weight,
  e) yttrium in an amount of from 0.1% by weight to 0.8% by weight, preferably from 0.3% by weight to 0.75% by weight,
  f) carbon in an amount of from 0% by weight to 1.2% by weight, preferably from 0.3% by weight to 1.1% by weight, more preferably from 0.5% by weight to 1.0% by weight,
  g) dysprosium in an amount of from 0% by weight to 1% by weight, for example from 0.1% by weight to 0.5% by weight,
  h) cerium in an amount of from 0% by weight to 1% by weight, for example from 0.1% by weight to 0.5% by weight, and
  i) the balance being nickel, the percentages of a) to i) adding up to 100% by weight.

The total amount of the at least one of tantalum and molybdenum, and the amounts of aluminum and silicon are each critical for avoiding delamination of the top coat from the bond coat or coating, and for achieving unexpectedly high thermal cyclic fatigue resistance and sulfidation resistance, and unexpectedly prolonged thermal cycle life in high temperature environments, such as gas turbine engine components with and without the presence of sulfur.

In aspects of the invention, the bond coating material may be in powder form, may be an alloy, or may be a bond coat or coating. The alloy may be in powder form, or wire, bar or rod form, or may be a bond coat or coating. In each instance, the chemical composition may be as described for the bond coating material.

In another aspect of the invention, a thermal spray powder may include the bond coating material alone or together with a top coat material, such as at least one of a thermal barrier coating (TBC) material, or an abradable coating material.

In another aspect of the invention, a thermal barrier coating (TBC) system includes a top coat and the bond coat or bond coating, with the top coat being bonded to the bond coat or bond coating. A coated substrate comprises a substrate and the thermal barrier coating system bonded to the substrate by the bond coat or coating. The thermal barrier coating system may be produced from the thermal spray powder. The thermal barrier coating system is bonded to a substrate, such as a superalloy, by the bond coat or bond coating, which is between the top coat and the substrate. The complete TBC system forms a desirable, slow-growing dense alpha-alumina layer of a thermally grown oxide (TGO) at the interface of the bond coat and top coat, such as the TBC, which is sufficient to block oxygen to further diffuse inward to prevent the substrate from oxidation. The TGO which is formed is not excessively thick so as to cause failure due to delamination by thermal internal stresses for an unexpectedly prolonged period of time.

In an additional aspect of the invention, delamination of a top coat from a substrate is reduced by bonding the top coat to the substrate with the bond coat or coating, such as an alloy of the present invention, and nucleating and growing a thermally grown oxide (TGO) between the top coat and the bond coat to block oxygen from further diffusing inward to prevent oxidation of the substrate. The top coat may comprise a thermal barrier coating (TBC), and the substrate may comprise a gas turbine engine component. The TGO may comprise alpha alumina, and reduces delamination from thermal internal stress in the presence or absence of sulfur.

BRIEF DESCRIPTION OF THE DRAWINGS

The present invention is further illustrated by the accompanying drawings wherein.

DETAILED DESCRIPTION OF THE INVENTION

Figure 1:
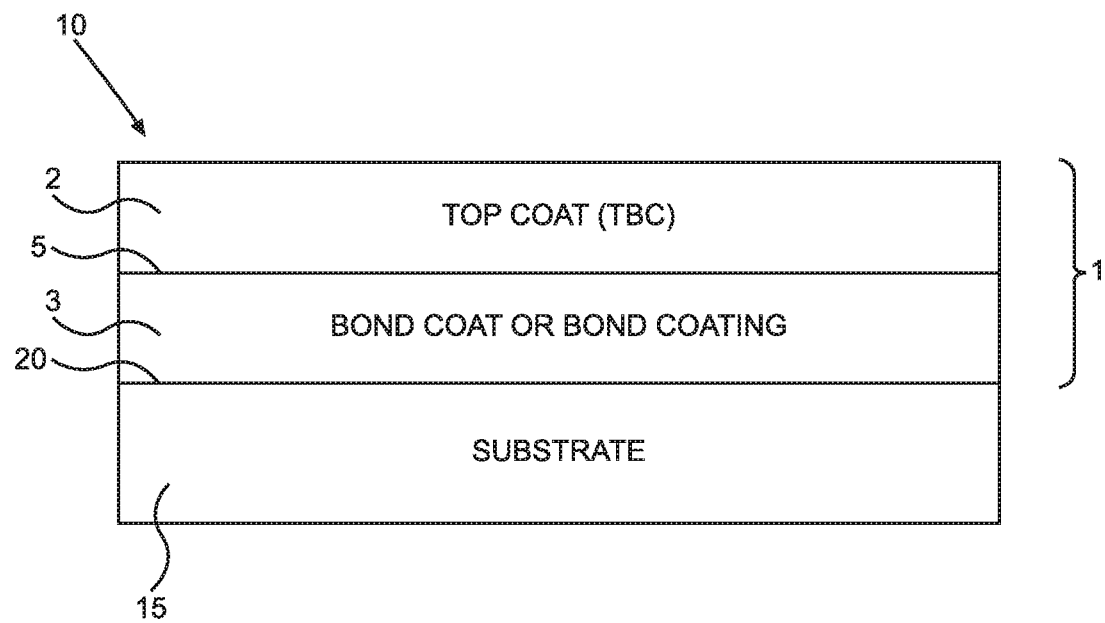
FIG. 1 schematically illustrates a coated substrate having a thermal barrier coating (TBC) system which includes a top coat, such as a thermal barrier coating (TBC) bonded to the bond coat or coating in accordance with the present invention.

The present invention provides an advanced bond coating material for forming a bond coat or bond coating which bonds a top coat, such as thermal barrier coating (TBC) to a substrate, such as a superalloy employed in high temperature gas turbine engine components. The TBCs using the bond coat to bond to a substrate such as a superalloy exhibit unexpectedly high thermal cyclic fatigue resistance and sulfidation resistance, and unexpectedly prolonged thermal cycle life in the high temperature environments of gas turbine engine components with and without the presence of sulfur. The complete TBC system forms a desirable, dense alpha-alumina layer of TGO at the interface of the bond coat and top coat, such as the TBC, which is sufficient to block oxygen to further diffuse inward to prevent the substrate from oxidation. The TGO which is formed is not excessively thick so as to cause failure due to delamination by thermal internal stresses for an unexpectedly prolonged period of time.

The bond coating material is nickel-based and includes chromium with a critical total amount of at least one of tantalum and molybdenum, and a critical amount of aluminum for avoiding delamination of the top coat from the bond coat or coating, and for achieving unexpectedly high thermal cyclic fatigue resistance and sulfidation resistance, and unexpectedly prolonged thermal cycle life in high temperature environments, such as gas turbine engine components with and without the presence of sulfur. The presence of cobalt, rhenium, hafnium, and platinum, which are expensive materials, is not needed in the bond coating material, or bond coat or bond coating. Additionally, according to The National Institute for Occupational Safety and Health (NIOSH) occupational exposure to cobalt can harm the eyes, skin, heart, and lungs, and may cause cancer. Reducing usage of cobalt in powder form is in compliance with worldwide environmental and health policies and regulations.

Furnace cyclic lifetime of the top coating, such as a thermal barrier coating (TBC) using a nickel based bond coat material of the present invention may be unexpectedly doubled or even tripled compared to furnace cyclic lifetimes of a cobalt-based bond coat such as a CoNiCrAlY bond coat, for example Diamalloy® 4700. The TBC systems of the present invention exhibit unexpectedly superior stability at temperatures above 1800° F., for example at temperatures above 2000° F. with and without the presence of sulfur.

For example, in Furnace Cycling Tests (FCT) with a 70 minute cycling time (heating up from room temperature to an operation temperature of 1135° C. (2075° F.) in 10 minutes and holding for 50 minutes, and cooling down to room temperature in 10 minutes) without the presence of sulfur, the average cycles to failure of a TBC system with a cobalt based Diamalloy 4700 bond coat or coating may be used as a baseline. In embodiments of the invention, a TBC system with the Ni based bond coat or coating of the present invention provides an unexpectedly higher average cycles to failure with an increased lifetime of cycles of at least 75%, for example at least 125%, or even at least 200% compared to the baseline Diamalloy 4700 bond coat lifetime, as demonstrated in the accompanying Examples. Unexpectedly higher lifetime cycles are also obtained in embodiments of the invention at even higher testing temperatures of 1150° C. (2102° F.) with the Ni based bond coat or coating of the present invention, with an increased lifetime of cycles of at least 55%, for example at least 80%, or even at least 150% compared to the baseline Diamalloy 4700 bond coat lifetime, as demonstrated in the accompanying Examples.

In the presence of sulfur, in Furnace Cycling Tests (FCT) with a 60 minute cycling time (heating up from room temperature to an operation temperature of 1121° C. (2050° F.) in 10 minutes and holding for 40 minutes, and cooling down to room temperature in 10 minutes) the average cycles to failure of a TBC system with a cobalt based Diamalloy 4700 bond coat or coating may be reduced by about 33% in the presence of sulfur compared to without sulfur. However, in embodiments of the invention, a TBC system with the Ni based bond coat or coating of the present invention can provide an unexpectedly higher average cycles to failure with an increased lifetime of cycles of at least 65%, for example at least 100%, in the presence of sulfur compared to the baseline Diamalloy 4700 bond coat lifetime in the absence of sulfur, as demonstrated in the accompanying Examples. Also, about the same unexpectedly high average number of cycles to failure and increase in lifetime in the presence of sulfur as obtained in the absence of sulfur is obtained with the Ni based bond coat or coating of the present invention in embodiments of the invention, as demonstrated in the accompanying Examples.

In accordance with the present invention, a bond coating material which provides unexpectedly high thermal cyclic fatigue resistance and sulfidation resistance, and unexpectedly prolonged thermal cycle life in high temperature environments of gas turbine engine components with and without the presence of sulfur comprises:
   a) chromium in an amount of from 10% by weight to 30% by weight, preferably from 20% by weight to 26% by weight,
   b) at least one of tantalum and molybdenum, where the total amount of tantalum and molybdenum is from 3% by weight to 15% by weight, preferably from 5% by weight to 12% by weight, more preferably from 9% by weight to 11% by weight, for example,
      1) 5% by weight to 15% by weight Mo, without any Ta, or
      2) 3% by weight to 7% by weight Mo with 3% by weight to 7% by weight Ta, or,
      3) 5% by weight to 15% by weight Ta, without any Mo.
   c) aluminum in an amount of from 5% by weight to 13% by weight, preferably from 6% by weight to 10% by weight,
   d) silicon in an amount of from 0.1% by weight to 1.4% by weight, for example from 0.5% by weight to 1.4% by weight, preferably from 0.3% by weight to 1.1% by weight, more preferably from 0.5% by weight to 1.0% by weight,
   e) yttrium in an amount of from 0.1% by weight to 0.8% by weight, for example from 0.3% by weight to 0.8% by weight, preferably from 0.3% by weight to 0.75% by weight, f) carbon in an amount of from 0% by weight to 1.2% by weight, for example from 0.5% by weight to 1.2% by weight, preferably from 0.3% by weight to 1.1% by weight, more preferably from 0.5% by weight to 1.0% by weight, g) dysprosium in an amount of from 0% by weight to 1% by weight, for example from 0.1% by weight to 0.5% by weight, h) cerium in an amount of from 0% by weight to 1% by weight, for example from 0.1% by weight to 0.5% by weight, and i) the balance being nickel, the percentages of a) to i) adding up to 100% by weight.

In embodiments of the invention, both tantalum and molybdenum may be present in the bond coating material, or only one of tantalum or molybdenum may be present, and the other is not present, with the proviso that:

1) the total amount of tantalum and molybdenum be from 3% by weight to 15% by weight,
2) preferably from 5% by weight to 12% by weight,
3) more preferably from 9% by weight to 11% by weight.

For example, in embodiments of the invention, for the bond coating or bond coating material:

1) The amount of tantalum may be from 0% by weight to 12% by weight, and the amount of molybdenum may be from 0% by weight to 12% by weight, but the total amount of tantalum and molybdenum must be from 3% by weight to 15% by weight.
2) The tantalum content may be from 4% by weight to 11% by weight, when used without molybdenum (molybdenum content of 0%) or with molybdenum. However, in the latter case, if the molybdenum is employed, its amount may be up to 4% by weight when the tantalum content is at the upper end of the range of 11% by weight, so that the total amount of tantalum and molybdenum is 15% by weight.
3) The amount of molybdenum may be from 4%. by weight to 11% by weight when used without or with tantalum. However, in the latter case, if the tantalum is employed, its amount may be up to 4% by weight when the molybdenum content is at the upper end of the range of 11% by weight, so that the total amount of tantalum and molybdenum is 15% by weight. In preferred embodiments, tantalum is employed with or without molybdenum.

In embodiments of the invention, the bond coating material may be manufactured in powder form or bulk form, such as wire, bar, rod or plate form. The bond coating material powder may be a homogeneous mixture of separate powders of each of the components of the bond coating material. The bond coating material powder may also be composed of particles, each of which contain all or some of the components of the bond coating material. For example, an alloy of all the components of the bond coating material may be ground to obtain a powder. The particle size of the bond coating material may depend upon the coating method employed. Conventional particle size distributions conventionally employed with a given coating method may be used with the bond coating materials of the present invention.

In other embodiments, the bond coating material may be an alloy or when applied and bonded to a substrate, the bond coating material may be a bond coat or bond coating, or layer on the substrate. The alloy may be in powder form, or wire, bar, rod, or plate form, or when applied and bonded to a substrate may be a bond coat or bond coating or layer. In each instance, the chemical composition of the alloy, in each of its forms, or when applied and bonded to a substrate as a bond coat or bond coating or layer on the substrate, may be as described for the bond coating material. As used herein, an alloy is as conventionally defined, and is a mixture of chemical elements, which forms an impure substance (admixture) that retains the characteristics of a metal. An alloy is distinct from an impure metal in that, with an alloy, the added elements are well controlled to produce desirable properties, while impure metals such as wrought iron are less controlled, but are often considered useful. Alloys are made by mixing two or more elements, at least one of which is a metal. This is usually called the primary metal or the base metal, and the name of this metal may also be the name of the alloy. The other constituents may or may not be metals, such as carbon, but, when mixed with the molten base, they will be soluble and dissolve into the mixture. As used herein, an alloy may be a solid solution of a metal and at least one other element, usually other metals to form a single crystalline phase. An alloy may be a combination of metals, or a combination of one or more metals with one or more other elements. An alloy may defined by a metallic bonding character, and an alloy may be a solid solution of metal elements (a single phase) or a mixture of metallic phases (two or more solutions).

In another aspect of the invention, a thermal spray powder may include the bond coating material alone or together with a top coat material, such as at least one of a thermal barrier coating (TBC) material, an abradable metal, an abradable alloy, or an abradable ceramic.

The top coat material may be any conventional or known top coat material or thermal barrier coating (TBC) material, such as those used for the coating of gas turbine engine parts, such as disclosed in U.S. Patent Application Publication No. 2018-0099909, the disclosure of which is herein incorporated by reference in its entirety. Other non-limiting examples of the top coat material which may be employed include aluminum alloys (e.g. AlSi) currently used in commercially available abradables: typical particle size 30-150 μm, nickel (e.g. NiCrFe, NiCrAl, NiCrAlY and NiCoCrAlY) and cobalt alloys (e.g. CoNiCrAlY) currently used in commercially available abradables: and utilizing a typical particle size 5-100 μm. The top coat materials can also include zirconia based ceramics currently used in commercially available abradables and TBCs (e.g. Dysprosia-stabilized $ZrO_2$ and Yttria-stabilized $rO2$) with a typical particle size of 10-150 μm as well as iron based alloys such as FeCrAl and FeCrAlY with a typical particle size of 5-100 μm. The top coat materials may include conventional or known fibers or fibrous materials for controlling porosity of the top coat material as disclosed in PCT International Publication No. WO2018152328, the disclosure of which is incorporated herein by reference in its entirety.

Other thermal barrier coatings which are well known including those with vertical cracks may also be employed as a top coat. There are numerous publications and patents disclosing thermal barrier coatings with vertical cracks, for example U.S. Pat. No. 5,073,433 to Taylor and U.S. Pat. No. 8,197,950 to Taylor et al. disclose segmented coatings. The disclosure of each of these US patents is herein expressly incorporated by reference in its entirety.

The substrate may be any known or conventional material or article in need of a top coat or barrier coating (TBC). Non-limiting examples of the substrate include alloys, or superalloys used in the manufacture of gas turbine engine parts, such as Hastelloy® X, as disclosed in U.S. Pat. No. 4,124,737 to Wolfa et al, the disclosure of which is herein incorporated by reference in its entirety. Hastelloy® X, as disclosed by Wolfa et al, has a nominal composition of 22.0 wt. % chromium; 9.0 wt. % molybdenum, 18.5 wt. % iron; 1.5 wt. % cobalt; 0.6 wt. % tungsten, 1.0 wt % silicon, 1.0 wt. % manganese, 0.1 wt. % carbon, and the balance nickel. Other non-limiting examples of known and conventional substrates which may be coated with the bond coat or bond coating of the present invention include steel, stainless steel, other iron-base alloys with low alloying content, chromium and chromium base alloys, and the refractory metal and refractory metal base alloys. Non-limiting examples of superalloy substrates which may be coated with the bond coat or bond coating of the present invention are known carbide reinforced superalloys, such a nickel-base and cobalt-base superalloys, directionally solidified nickel-base and cobalt-base superalloys including eutectic alloys, as well as refractory alloys, etc. as disclosed in U.S. Pat. No. 4,117,179, the disclosure of which is hereby incorporated by reference in its entirety. Non-limiting examples of substrates or articles which may be coated with the bond coat or coating of the present invention include turbine blades and vanes in gas turbine engines.

In another aspect of the invention, as schematically illustrated in FIG. 1, a thermal barrier coating (TBC) system 1 includes a top coat 2 and the bond coat or bond coating 3, with the top coat 2, such as a TBC, being bonded to the bond coat or bond coating 3 at the top coat/bond coat interface 5. A coated substrate 10 comprises a substrate 15 and the thermal barrier coating system 1 bonded to the substrate 15 by the bond coat or coating 3 at the substrate/bond coat interface 20. The thermal barrier coating system 1 may be produced from the thermal spray powder. The thermal barrier coating system 1 is bonded to a substrate 15, such as a superalloy or gas engine turbine component, by the bond coat or bond coating 3, which is between the top coat 2 and the substrate 15.

Figure 2:
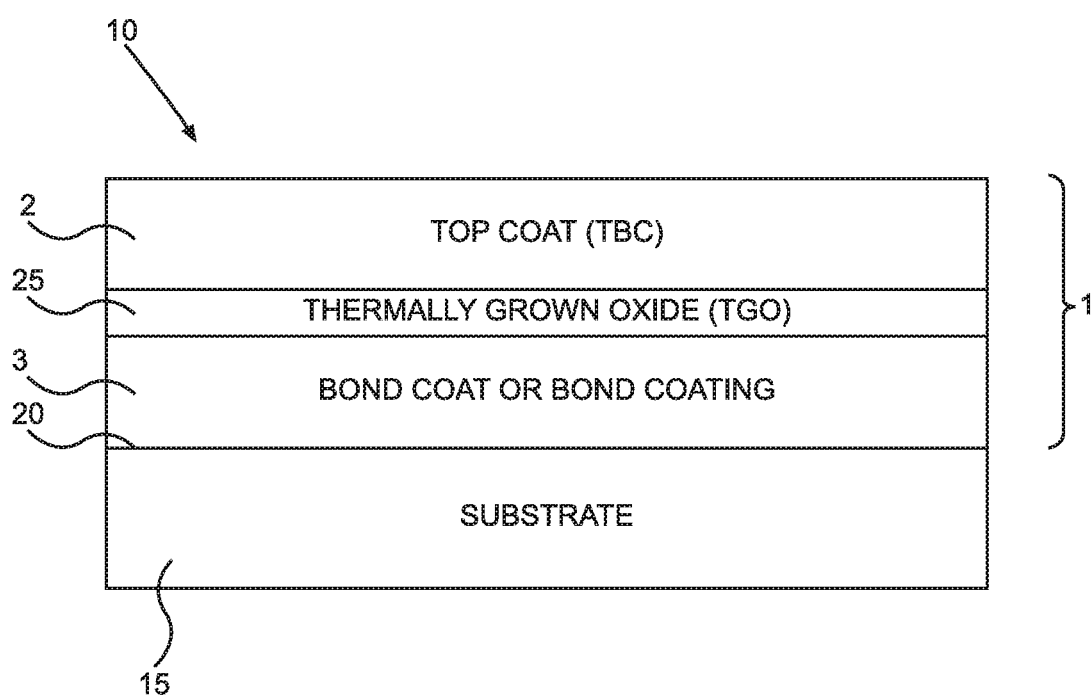
FIG. 2 schematically illustrates a coated substrate of FIG. 1 after subjecting it to high temperatures and a harsh environment as in a gas turbine engine which forms a desirable, dense alpha-alumina layer of thermally grown oxide (TGO) at the interface of the bond coat and top coat, such as the TBC, which is sufficient to block oxygen to further diffuse inward to prevent the substrate from oxidation in accordance with the present invention.

As schematically illustrated in FIG. 2, the complete TBC system 1 of the coated substrate 10 of FIG. 1 after being subjected to high temperatures and a harsh environment as in a gas turbine engine forms a desirable, slow-growing dense alpha-alumina layer of a thermally grown oxide (TGO) 25 at the interface 5 of the bond coat 3 and top coat 2, such as the TBC, which is sufficient to block oxygen to further diffuse inward to prevent the substrate 15 from oxidation. The TGO 25 which is formed is not excessively thick so as to cause failure due to delamination of the top coat 2 from the bond coat or bond coating 3 and substrate 15 by thermal internal stresses for an unexpectedly prolonged period of time. In embodiments of the invention, the TGO may have a thickness, X, from submicron to 12 microns, or 0<X<12 μm, preferably 0<X<10 μm.

In embodiments of the invention, multiple bond coats or bond coatings 3 and multiple top coats 2 may be employed, with each top coat 2 being on top of a bond coat 3 in alternating fashion, to provide a plurality of TBC systems 1, stacked and bonded one on another, with the bottommost bond coat 3 bonded to the substrate 15.

In an additional aspect of the invention, a method is provided for reducing delamination of a top coat from a substrate by bonding the top coat, to the substrate with the bond coat or coating, such as an alloy of the present invention, and nucleating and growing a thermally grown oxide (TGO) between the top coat and the bond coat to block oxygen from further diffusing inward to prevent oxidation of the substrate. The top coat may comprise a thermal barrier coating (TBC), and the substrate may comprise a gas turbine engine component. The TGO may comprise alpha alumina, and reduces delamination from thermal internal stress in the presence or absence of sulfur.

The bond coat or bond coating or bonding layer, and the top coat, such as the TBC may be deposited, applied, or laminated on the substrate using conventional thermal spray processes, such as air plasma spray, suspension plasma, high velocity oxy-fuel spray (HVOF), low pressure plasma spray (LPPS), vacuum plasma spray (VPS), chemical vapor deposition (CVD), plasma physical vapor deposition (PS-PVD), physical vapor deposition (PVD) which includes vacuum deposition methods, such as sputtering and evaporation, and conventional flame spray processes, such as combustion wire spray, and combustion powder spray, electric arc wire spray, powder flame spray, and electron beam physical vapor deposition (EBPVD). Conventional and known coating layer thicknesses may be employed for the bond coat or coating, and the top coat or TBC.

The present invention is further illustrated by the following non-limiting examples where all parts, percentages, proportions, and ratios are by weight, all temperatures are in ° C., and all pressures are atmospheric unless otherwise indicated:

EXAMPLES

The compositions of three nickel-based alloy samples of the present invention and a comparative or base-line cobalt-based alloy sample Diamalloy® 4700 (bond coating materials) used to make a bond coat for a coated substrate are shown in Table 1. The materials listed in Table 1 are sprayed by the high velocity oxy-fuel spray process (HVOF process) on Hastelloy X substrates to form four different bond coats. Hastelloy® X, as disclosed by Wolfa et al, has a nominal composition of 22.0 wt. % chromium; 9.0 wt. % molybdenum, 18.5 wt % iron; 1.5 wt. % cobalt; 0.6 wt. % tungsten, 1.0 wt % silicon, 1.0 wt. % manganese, 0.1 wt. % carbon, and the balance nickel. Then, an identical top coat (TBC) of 7 wt. % $Y_2O_3$ partially stabilized ZrO2 (Amdry® 204NS-1, made by Oerlikon Metco) is air plasma sprayed onto the bond coats to form four different TBC systems, named as Comparative TBC-D4700, and TBC Example 1, TBC Example 2, and TBC Example 3.

A FCT (Furnace Cyclic Test) for performance ranking of the complete TBC system emphasizing the bond coat/top coat interface, was conducted for each of the synthesized TBCs with a cycling time of 70 min (heating up in 10 minutes from room temperature to 1135° C., holding at 1135° C. for 50 min, and cooling down to room temperature in 10 minutes). The FCT was also conducted using a temperature of 1150° C. instead of 1135° C. The results are shown in Table 2.

A TBC can be degraded due to a harsh environment, the presence of sulfur (i.e., using oil containing a high sulfur content as fuel for an industrial gas turbine) in the TBC is an important factor which reduces the TBC lifetime. To evaluate the influence of sulfur, 40 mg/cm$^2$ of $Na_2SO_4$ salt powder are placed on the surface of the comparative D4700TBC and on the surface of the TBC Example 3 of the present invention. Then, the samples are heated up from room temperature to 920° C. ($Na_2SO_4$ has a melting point of about 880° C.) and held at that temperature for 24 hours so that the molten salt penetrates into the TBC systems. FCT tests were then performed on the salted and unsalted samples (also exposed to 920° C. for 24 hours before the FCT tests) with a cycling time of 60 minutes (heating from room temperature up to 1121° C. in 10 minutes, holding at 1121° C. for 40 min, and cooling down to room temperature in 10 min), and the results are shown in Table 3.

The Table 1 compositions of the samples tested, the Table 2 results of the Furnace Cyclic Tests (FCT) for unsalted samples, and the Table 3 results of the Furnace Cyclic Tests (FCT) for the salted samples are:

TABLE 1

Compositions of the Bond Coating Materials (Alloys) Used To Make A Bond Coat For A Coated Substrate

| Sample | Co | Ni | Cr | Mo | Ta | Al | Si | Y | C |
|---|---|---|---|---|---|---|---|---|---|
| Comparative Baseline TBC D4700 | balance | 31.51 | 20.6 | — | — | 7.73 | — | 0.42 | 0.012 |
| TBC 1 | — | Balance | 10~30 | 5~15 | — | 5~13 | 0.5~1.4 | 0.3~0.8 | 0.5~1.2 |
| TBC 2 | — | Balance | 10~30 | 3~7 | 3~7 | 5~13 | 0.5~1.4 | 0.3~0.8 | 0.5~1.2 |
| TBC 3 | — | Balance | 10~30 | — | 5~15 | 5~13 | 0.5~1.4 | 0.3~0.8 | 0.5~1.2 |

TABLE 2

Furnace Cycling Test (FCT) Results of the Bond Coating Materials (Alloys) Used To Make A Bond Coat For A Coated Substrate (70 minutes, 1135° C. and 1150° C.)

| Sample | Lifetime of Cycles Increased By %, Tested at 1135° C. | Lifetime of Cycles Increased By %, Tested at 1150° C. |
|---|---|---|
| Comparative Baseline TBC D4700 | n/a | n/a |
| TBC 1 | 80% | 59% |
| TBC 2 | 134% | 83% |
| TBC 3 | 207% + (tests stopped) | 158 + % (tests stopped) |

TABLE 3

Sulfidation Resistance of the Bond Coating Materials (Alloys) Used To Make A Bond Coat For A Coated Substrate (60 minutes, 1121° C.)

| Sample | Salted Condition | *Lifetime of Cycles Increased By %, |
|---|---|---|
| Comparative Baseline TBC D4700 | Unsalted | n/a |
|  | Salted | −33.3% |
| TBC 1 | Salted | 68% |
| TBC 2 | Salted | 107.6% + (stopped tests) |
| TBC 3 | Unsalted | 101.6% + (stopped tests) |
|  | Salted | 101.6% + (stopped tests)% |

*All data for % in Table 3 are comparison with the data for the unsalted baseline TBC 4700 sample.

The data listed in Table 2 show that the alloys of the present invention are unexpectedly able to increase the TBC lifetime by 80% to more than 207% at a test temperature of 1135° C., as measured by the % increase in average number of cycles to failure, compared to the TBC lifetime of the comparative baseline alloy Diamalloy® 4700 (TBC D4700) which is commonly used in the thermal barrier coating industry. The data listed in Table 2 also show that the alloys of the present invention are unexpectedly able to increase the TBC lifetime by 59% to more than 158% at a test temperature of 1150° C., as measured by the % increase in average number of cycles to failure, compared to the TBC lifetime of the comparative baseline alloy Diamalloy® 4700.

The results in Table 3 indicate the salted comparative baseline alloy TBC (TBC D4700) results in a reduction of 33% in the TBC lifetime for the salted sample, compared to 302.5 cycles to TBC lifetime for the unsalted sample. The results in Table 3 show that the salted alloy TBC-1 of the present invention has an unexpectedly longer lifetime which is 68% longer than the lifetime of the comparative unsalted baseline TBC D4700. The results in Table 3 also show that the salted alloy TBC-2 of the present invention has an unexpectedly longer lifetime which is at least 107.6% (at stopping point) longer than the lifetime of the comparative unsalted baseline TBC D4700. Additionally, the results in Table 3 show that the salted alloy TBC-3 of the present invention has an unexpectedly longer lifetime which is least 101.6% (at stopping point) longer than the lifetime of the comparative salted baseline TBC D4700. Also, as shown in Table 3, the lifetime at the stopping point for the TBC-3 sample of the present invention is unexpectedly the same whether salted or not salted, and is also unexpectedly at least 101.6%% longer than the lifetime of the comparative unsalted baseline alloy TBC D4700.

Further, at least because the invention is disclosed herein in a manner that enables one to make and use it, by virtue of the disclosure of particular exemplary embodiments, such as for simplicity or efficiency, for example, the invention can be practiced in the absence of any step, additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A cobalt-free bond coating material comprising:
 a) chromium in an amount of from 10% by weight to 30% by weight,
 b) tantalum in an amount greater than 0% by weight and molybdenum in an amount of at least 3% by weight, where a total amount of the tantalum and molybdenum is from 5% by weight to 15% by weight,
 c) aluminum in an amount of from 5% by weight to 13% by weight,
 d) silicon in an amount of from 0.1% by weight to 1.4% by weight,
 e) yttrium in an amount of from 0.1% by weight to 0.8% by weight, f) carbon in an amount of from 0.5% by weight up to 1.0% by weight, and
g) a balance to 100% by weight being nickel.

2. The cobalt-free bond coating material as claimed in claim 1, wherein the bond coating material is provided in a form selected from the group consisting of a powder, an alloy, a wire, a bar, a rod, a plate, and a bond coat.

3. The cobalt-free bond coating material as claimed in claim 1 where an amount of the tantalum is from 4% by weight to 11% by weight.

4. The cobalt-free bond coating material as claimed in claim 1, where the amount of the tantalum is in an amount greater than 0% by weight and up to 12% by weight, and the amount of the molybdenum is from 3% by weight up to 12% by weight.

5. A thermal spray powder comprising the cobalt-free bond coating material of claim 1.

6. The thermal spray powder as claimed in claim 5, further comprising at least one of a thermal barrier coating (TBC) material, an abradable metal, an abradable alloy, or an abradable ceramic.

7. The cobalt-free bond coating material as claimed in claim 1, wherein:
b) the total amount of the tantalum and molybdenum is from 5% by weight to 12% by weight.

8. The cobalt-free bond coating material as claimed in claim 1, wherein:
b) the total amount of the tantalum and molybdenum is from 9% by weight to 11% by weight.

9. The cobalt-free bond coating material as claimed in claim 7, wherein:
c) the aluminum is in an amount of from 6% by weight to 10% by weight, and
d) the silicon is in an amount of from 0.3% by weight to 1.1% by weight.

10. The cobalt-free bond coating material as claimed in claim 8, wherein:
c) the aluminum is in an amount of from 6% by weight to 10% by weight, and
d) the silicon is in an amount of from 0.3% by weight to 1.1% by weight.

11. A bond coating material comprising:
a) chromium in an amount of from 20% by weight to 26% by weight,
b) tantalum in an amount greater than 0% by weight and molybdenum in an amount of at least 3% by weight, where a total amount of tantalum and molybdenum is from 5% by weight to 12% by weight,
c) aluminum in an amount of from 6% by weight to 10% by weight,
d) silicon in an amount of from 0.3% by weight to 1.1% by weight,
e) yttrium in an amount of from 0.3% by weight to 0.75% by weight,
f) carbon in an amount of from 0.5% by weight to 1.0% by weight,
g) at least one of:
dysprosium in an amount of from 0.1% by weight to 0.5% by weight or cerium in an amount of from 0.1% by weight to 0.5% by weight, and
h) a balance to 100% by weight being nickel.

12. An alloy comprising:
a) chromium in an amount of from 10% by weight to 30% by weight,
b) tantalum in an amount greater than 0% by weight and molybdenum in an amount of at least 3% by weight, where a total amount of tantalum and molybdenum is from 5% by weight to 15% by weight,
c) aluminum in an amount of from 5% by weight to 13% by weight,
d) silicon in an amount of from 0.3 by weight to 1.1% by weight,
e) yttrium in an amount of from 0.1% by weight to 0.8% by weight,
f) carbon in an amount of from 0.5% by weight to 1.0% by weight, and
g) a balance to 100% by weight being nickel.

13. The alloy as claimed in claim 12, wherein:
a) the chromium is in an amount of from 20% by weight to 26% by weight,
b) the total amount of the tantalum and molybdenum is from 5% by weight to 12% by weight, and
c) the aluminum is in an amount of from 6% by weight to 10% by weight.

14. A bond coat or coating comprising the alloy of claim 12.

15. A thermal barrier coating system comprising a top coat and a bond coat or coating of claim 14.

16. A coated substrate comprising a substrate and a thermal barrier coating system of claim 15 bonded to the substrate by the bond coat or coating.

17. A method for reducing delamination of a top coat from a substrate comprising bonding the top coat to the substrate with an alloy of claim 12 as a bond coat, and nucleating and growing a thermally grown oxide (TGO) between the top coat and the bond coat to block oxygen from further diffusing inward to prevent oxidation of the substrate.

18. A method as claimed in claim 17, wherein the top coat comprises a thermal barrier coating (TBC), and the substrate comprises a gas turbine engine component, and the TGO comprises alpha alumina, and reduces delamination from thermal internal stress in the presence of sulfur.

19. A method for reducing delamination of a top coat from a substrate comprising bonding the top coat to the substrate with a bond coating material of claim 1 as a bond coat, and nucleating and growing a thermally grown oxide (TGO) between the top coat and the bond coat to block oxygen from further diffusing inward to prevent oxidation of the substrate.

20. A method as claimed in claim 19, wherein the top coat comprises a thermal barrier coating (TBC), and the substrate comprises a gas turbine engine component, and the TGO comprises alpha alumina, and reduces delamination from thermal internal stress in the presence of sulfur.

21. The bond coating material according to claim 1, wherein the tantalum is in an amount of 3% by weight to 7% by weight and the total amount of tantalum and molybdenum is from 6% by weight to 14% by weight.

22. The bond coating material according to claim 1, wherein the tantalum is in an amount of at least 3% by weight and the total amount of tantalum and molybdenum is from 6% by weight to 14% by weight.

23. The bond coating material according to claim 1, further comprising at least one of:
dysprosium in an amount of up to 1% by weight, or
cerium in an amount of up to 1% by weight.

24. The alloy according to claim 12, wherein the tantalum is in an amount of 3% by weight to 7% by weight and the molybdenum is in an amount of 3% by weight to 7% by weight, and the total amount of tantalum and molybdenum is from 6% by weight to 14% by weight.

25. The alloy to claim 12, wherein the tantalum is in an amount of at least 3% by weight and the total amount of tantalum and molybdenum is from 6% by weight to 14% by weight.

26. The alloy according to claim 17, further comprising at least one of:
   dysprosium in an amount of up to 1% by weight, or
   cerium in an amount of up to 1% by weight.

\* \* \* \* \*